(12) United States Patent
Toyama (10) Patent No.: US 6,351,965 B1
(45) Date of Patent: Mar. 5, 2002

(54) COOLING AND HEATING CYCLE APPARATUS AND REFRIGERANT CYCLE APPARATUS

(75) Inventor: Isamu Toyama, Shizuoka-ken (JP)

(73) Assignee: Fuji International Corporation, Shizuoka-ken (JP)

( * ) Notice: Subject to any disclaimer, the term of this patent is extended or adjusted under 35 U.S.C. 154(b) by 0 days.

(21) Appl. No.: 09/597,571

(22) Filed: Jun. 20, 2000

(51) Int. Cl.⁷ .............................................. F25B 13/00
(52) U.S. Cl. .......................... 62/324.6; 62/217; 138/46; 251/301
(58) Field of Search ............................ 62/324.6, 324.1, 62/217, 527, 528, 160, 218; 251/301, 248; 138/46

(56) References Cited

U.S. PATENT DOCUMENTS

| | | | |
|---|---|---|---|
| 1,991,006 A | * | 2/1935 | Wilson |
| 3,698,204 A | * | 10/1972 | Schlotterbeck et al. ... 62/217 X |
| 3,924,832 A | * | 12/1975 | Babcock ..................... 251/301 |
| 4,373,546 A | * | 2/1983 | Krakovsky ............... 251/301 X |
| 4,516,606 A | * | 5/1985 | Worley ..................... 137/625.3 |
| 4,989,414 A | * | 2/1991 | Murayama et al. ....... 62/217 X |

FOREIGN PATENT DOCUMENTS

| | | | |
|---|---|---|---|
| JP | 03001054 A | * | 1/1991 |
| JP | 2000009358 A | * | 1/2000 |

* cited by examiner

*Primary Examiner*—Henry Bennett
*Assistant Examiner*—Chen-Wen Jiang
(74) *Attorney, Agent, or Firm*—Wenderoth, Lind & Ponack, L.L.P.

(57) ABSTRACT

A cooling and heating cycle apparatus includes a high pressure coolant gas discharged from an outlet port of a compressor and supplied selectively to one end or the other of a heat exchanger through a high/low pressure switch valve. A low pressure coolant gas expelled from the other end of the heat exchanger is supplied to an inlet port of the compressor through the high/low pressure switch valves. A low pressure coolant gas flow rate regulating valve for controlling a flow rate of the low pressure coolant gas supplied to the inlet portion of the compressor is disposed between the compressor and the high/low pressure switch valve.

10 Claims, 6 Drawing Sheets

COOLING AND HEATING CYCLE APPARATUS AND REFRIGERANT CYCLE APPARATUS

BACKGROUND OF THE INVENTION

1. Field of the Invention

This invention relates to a cooling and heating cycle apparatus for switching a cooling mode and a heating mode from one to the other by switching flow through a high/low pressure flow passage by using a high/low pressure switch valve. It also relates to a refrigerant cycle apparatus equipped with no high/low pressure switch valve, such as a drinking water cooling device.

2. Related Art

Figure 1A:
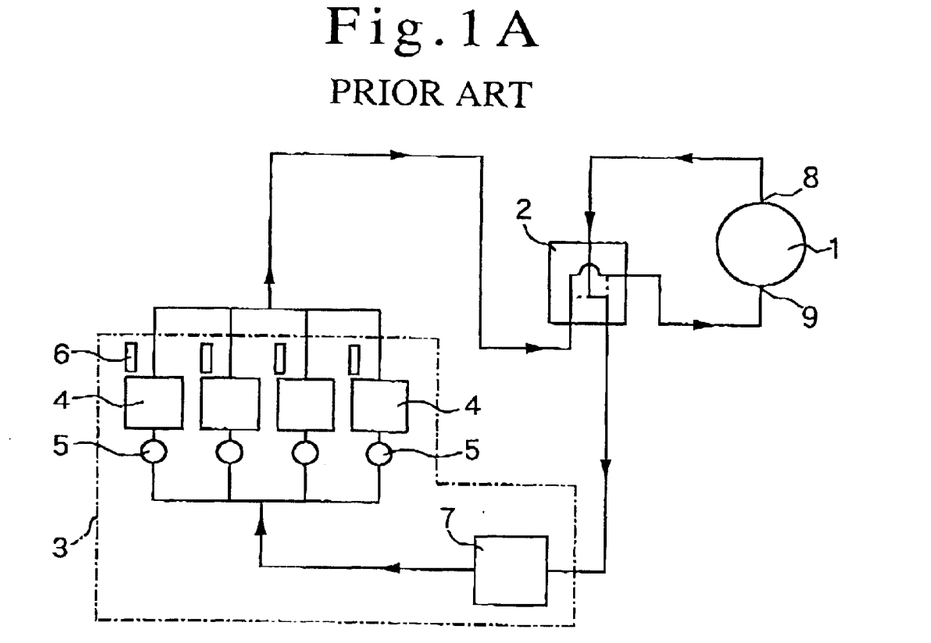
FIG. 1A is a diagram showing a cooling cycle in a conventional cooling/heating cycle apparatus and FIG. 1B is a diagram showing a heating cycle in the conventional cooling/heating cycle apparatus.
Figure 1B:
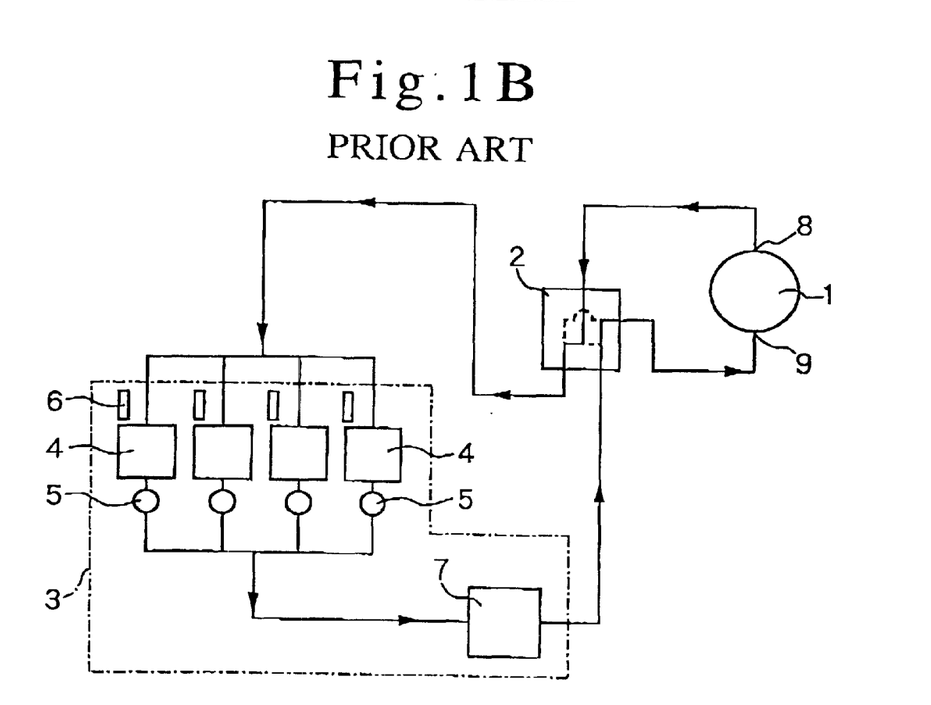

The conventional cooling/heating apparatus, as shown in FIG. 1A and 1B, constitutes a cooling and heating cycle in which a high pressure coolant gas discharged from an outlet port 8 of a compressor 1 is supplied to one end or the other end of a heat exchanger 3 through a high/low pressure switch valve 2. A low pressure coolant gas is led out from the other remaining end of the heat exchanger 3 and is supplied to an inlet port 9 of the compressor 1 through the high/low pressure switch valve 2.

Moreover, an electronic expansion valve 5 and a thermistor 6 for detecting the cooling and heating temperatures are disposed on one end of an evaporator 4 constituting the heat exchanger 3. Based on the detection of the cooling temperature made by the thermistor 6, the electronic expansion valve 5 is controlled and the flow rate of a coolant liquid supplied to the evaporator (indoor equipment) 4 is regulated, thereby regulating the room temperature in a cooling cycle (FIG. 1A).

Likewise, based on the detection of the heating temperature made by the thermistor 6, the electronic expansion valve 5 is controlled and the flow rate of a coolant supplied to a condenser (outdoor equipment) 7 from the evaporator 4 constituting the heat exchanger 3 is regulated, thereby regulating the room temperature in a heating cycle (FIG. 1B). The space between the compressor 1 and the evaporator 4 and the space between the compressor 1 and the condenser 7 form a coolant gas flow passage in the cooling and heating cycle. A space between the evaporator 4 and the condenser 7 forms a coolant liquid flow passage.

Accordingly, the electronic expansion valve 5 is a valve for controlling the flow rate of the coolant liquid. An electronic expansion valve is provided for each evaporator 4. That is to say, in the case where each of a plurality of rooms has an evaporator 4, an electronic expansion valve 5 is disposed in parallel for each evaporator.

SUMMARY OF THE INVENTION

It is an object of the present invention to provide a cooling and heating cycle apparatus and a refrigerant cycle apparatus, in which an output of a compressor (i.e., a low pressure coolant gas) can be controlled stably and properly and in which the cost of the compressor can be reduced.

To achieve the above objects, from one aspect of the present invention, there is essentially provided a cooling and heating cycle apparatus in which a high pressure coolant gas discharged from an outlet port of a compressor is supplied selectively to one side or the other end of a heat exchanger by a high/low pressure switch valve. A low pressure coolant gas is led out from the other end of the heat exchanger and is supplied to an inlet port of the compressor by the high/low pressure switch valve. A low pressure coolant gas flow regulating valve for controlling a flow rate of the low pressure coolant gas supplied to the inlet portion of the compressor is disposed between the compressor and the high/low pressure switch valve.

It is preferred that the low pressure coolant gas flow rate switch valve is a rotatable valve element disposed between a low pressure coolant gas inlet pipe and a low pressure coolant gas outlet pipe, and that the rotatable valve element is provided with a valve hole for passing a low pressure coolant gas discharged from an opening of the low pressure coolant inlet pipe on its outlet port side. A communication area between the low pressure coolant gas passage valve hole and an opening of the low pressure coolant gas outlet pipe on its inlet port side is regulated by controlling an angle of rotation of the rotatable valve element, thereby regulating a flow rate of the low pressure coolant gas supplied to the compressor.

It is also preferred that the rotatable valve element is interposed between an outlet port side opening end face of the low pressure coolant gas inlet pipe and an inlet port side opening end face of the low pressure coolant gas outlet pipe.

In another aspect of the present invention; there is essentially provided a refrigerant cycle apparatus in which a high pressure coolant gas discharged from an outlet port of a compressor is supplied to one end of a heat exchanger, and a low pressure coolant gas led out from the other end of the heat exchanger is supplied to an inlet port of the compressor. A low pressure coolant gas flow rate regulating valve for controlling a flow rate of the low pressure coolant gas supplied to the inlet port of the compressor is disposed between the other end of the heat exchanger and the inlet port of the compressor.

It is preferred that the low pressure coolant gas flow rate regulating valve includes a rotatable valve element disposed between a low pressure coolant gas inlet pipe and a low pressure coolant gas outlet pipe. The rotatable valve element has a valve hole for passing the low pressure coolant gas discharged from the outlet port side opening of the low pressure coolant gas inlet pipe. A communication area between the low pressure coolant gas passage valve hole and an opening of the low pressure coolant gas outlet pipe on its inlet port side is regulated by controlling an angle of rotation of the rotatable valve element, thereby regulating a flow rate of the low pressure coolant gas supplied to the compressor.

It is also preferred that the rotatable valve element be interposed between an outlet port side opening end face of the low pressure coolant gas inlet pipe and an inlet port side opening end face of the low pressure coolant gas outlet pipe.

The novel features which are considered characteristic of this invention are set out in the appended claims. The invention itself, however, together with additional objects and advantages thereof will be best understood from the following detailed description taken in conjunction with the accompanying drawings which illustrate, by way of example only, a preferred embodiment of this invention.

DETAILED DESCRIPTION OF THE EMBODIMENT

Figure 2A:
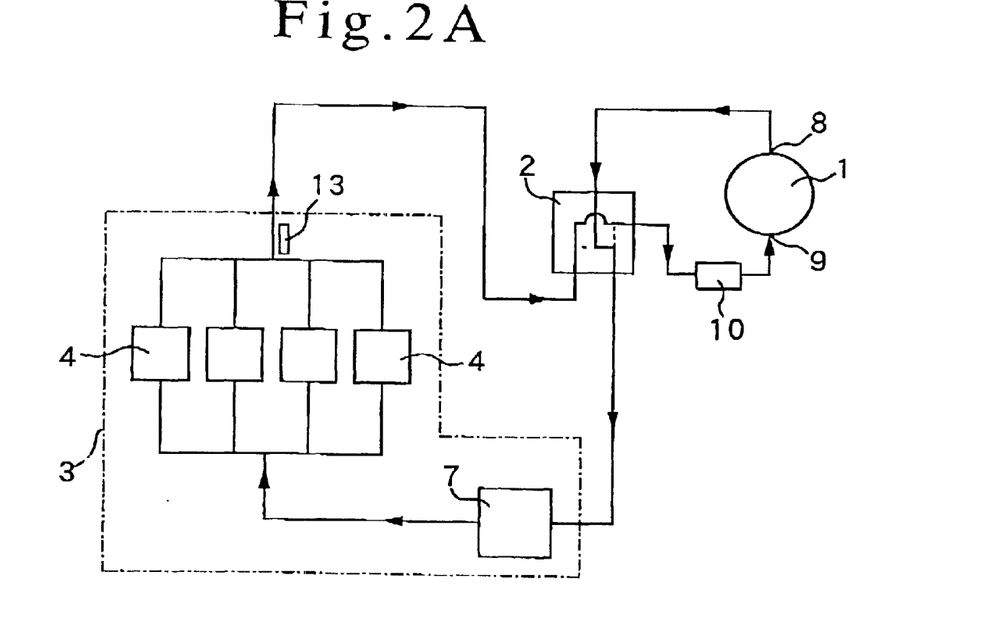
FIG. 2A is a diagram showing a cooling cycle in a cooling and heating cycle apparatus according to the present invention and FIG. 2B is a diagram showing a heating cycle in the cooling and heating cycle apparatus according to the present invention.
Figure 2B:
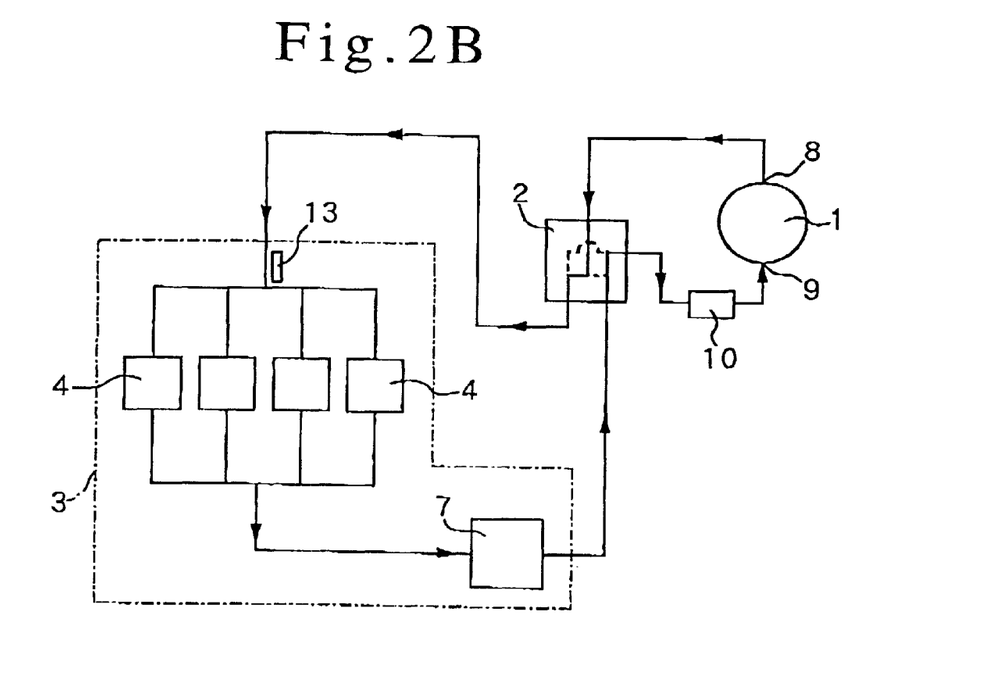
Figure 3A:
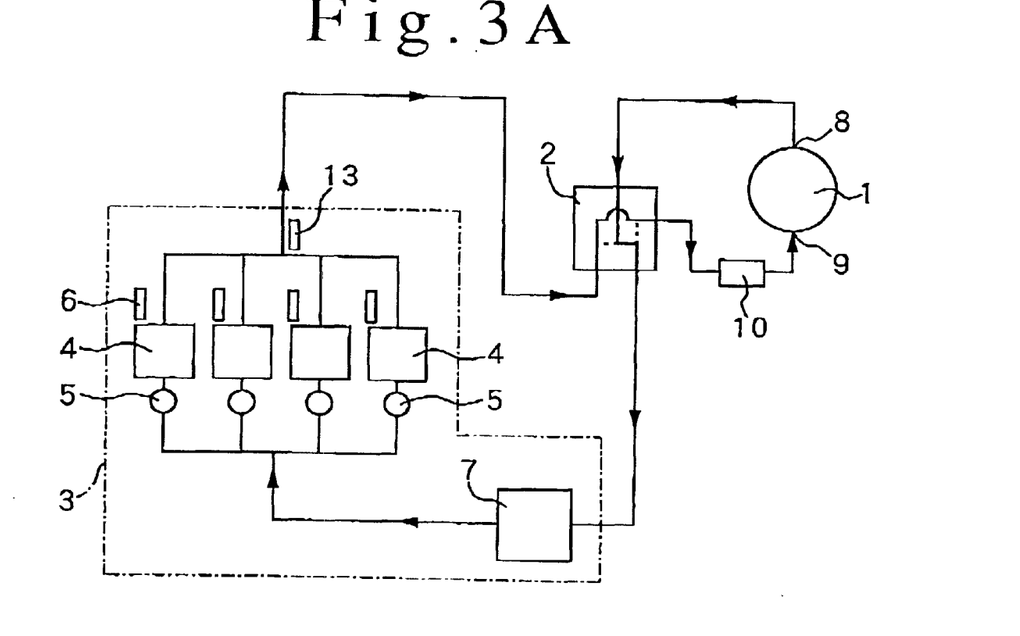
FIG. 3A is a diagram showing a cooling cycle in a cooling and heating cycle apparatus according to a second embodiment of the present invention and FIG. 3B is a diagram showing a heating cycle in the cooling and heating cycle apparatus according to the second embodiment of the present invention.
Figure 3B:
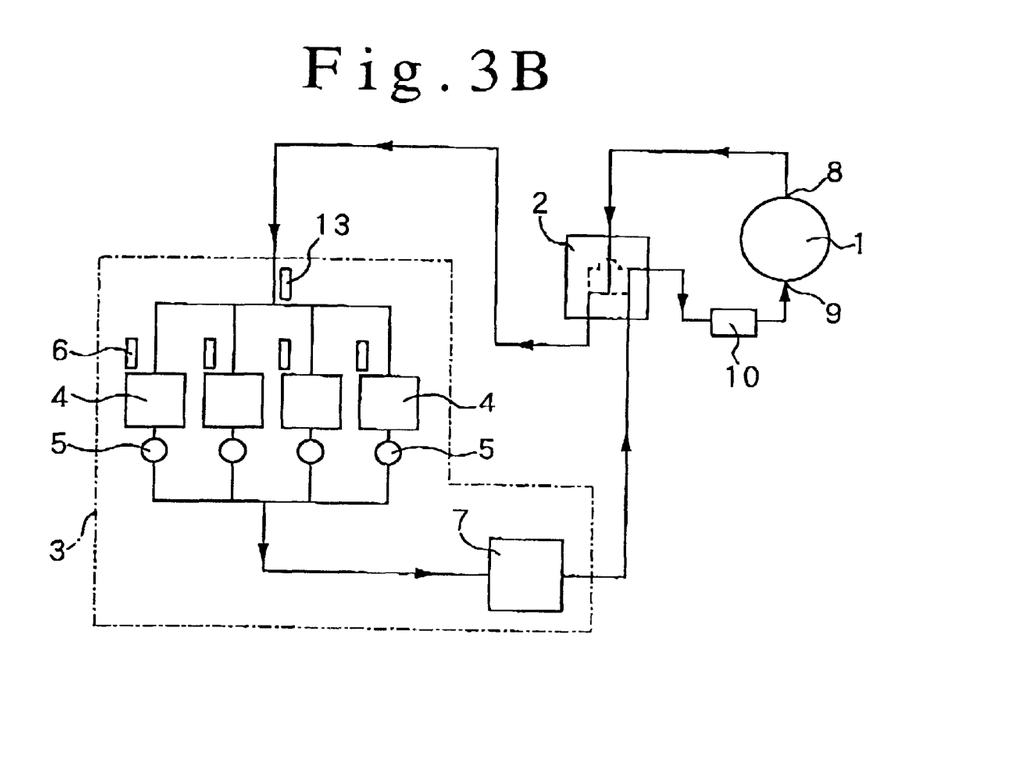

FIGS. 2A, 2B, 3A and 3B show a cooling and heating cycle apparatus, FIGS. 2A and 3A show a cooling cycle and FIGS. 2B and 3B show a heating cycle.

First, a cooling cycle is described with reference to FIGS. 2A and 3A. A high pressure coolant gas discharged from an outlet port 8 of a compressor 1 is supplied to one end (a first end) of a heat exchanger 3 through a high/low pressure switch valve 2.

A low pressure coolant gas expelled from the other end (a second end) of the heat exchanger 3 is supplied to an inlet port 9 of the compressor 1 through the high/low pressure switch valve 2.

In the above cooling and heating cycle apparatus, a low pressure coolant gas flow rate regulating valve 10 for controlling a flow rate of the low pressure coolant gas supplied to the inlet port 9 of the compressor 1 is disposed between the compressor 1 and the high/low pressure switch valve 2.

By regulating the flow rate of the low pressure coolant gas supplied to the compressor 1, which regulation is made by the low pressure coolant gas flow rate regulating valve 10, the capacity of the compressor 1 is regulated and the flow rate of the high pressure coolant gas discharged from the compressor 1 and supplied to a condenser 7 is regulated, thereby regulating the temperatures collectively. This regulation is the flow rate regulation of the low pressure coolant gas, i.e., gas.

More specifically, the heat exchanger 3 is comprised of an evaporator (indoor equipment) 4 and a condenser (outdoor equipment) 7. The high pressure coolant gas is supplied to a first end of the condenser 7 by the high/low pressure switch valve 2. A coolant liquid discharged from the other (second) end of the condenser 7 is supplied to a first end side of the evaporator 4, and the low pressure coolant gas discharged from the other (second) end of the evaporator 4 is supplied to the inlet port 9 of the compressor 1 through the high/low pressure switch valve 2, thereby constituting a cooling cycle. According to the present invention, the low pressure coolant gas flow rate regulating valve 10 for controlling the flow rate of the low pressure coolant gas supplied to the inlet port 9 of the compressor 1 is disposed between the compressor 1 and the high/low pressure switch valve 2.

Next, a heating cycle is described with reference to FIGS. 2B and 3B. A high pressure coolant gas discharged from an outlet port 8 of the compressor 1 is supplied to the second end of the heat exchanger 3 through the high/low pressure switch valve 2.

A low pressure coolant gas expelled from the first end of the heat exchanger 3 is supplied to the inlet port 9 of the compressor 1 through the high/low pressure switch valve 2, thereby forming a heating cycle.

In the above cooling and heating cycle apparatus, a low pressure coolant gas flow rate regulating valve 10 for controlling a flow rate of the low pressure coolant gas supplied to the inlet port 9 of the compressor 1 is disposed between the compressor 1 and the high/low pressure switch valve 2.

By regulating flow rate of the low pressure coolant gas supplied to the compressor 1, which regulation is made by the low pressure coolant gas flow rate regulating valve 10, the capacity of the compressor 1 is regulated and the flow rate of the high pressure coolant gas discharged from the compressor 1 and supplied to the condenser 7 is regulated, thereby regulating the temperatures collectively. This regulation is the flow rate regulation of the low pressure coolant gas, i.e., gas.

More specifically, the heat exchanger 3 is comprised of the evaporator (indoor equipment) 4 and the condenser (outdoor equipment) 7. The high pressure coolant gas is supplied to the second end of the evaporator 4 through the high/low pressure switch valve 2, and the coolant liquid discharged from the first end of the evaporator 4 is supplied to the second end of the condenser 7 through the high/low pressure switch valve 2, and the low pressure coolant gas discharged from the first end of the condenser 7 is supplied to the inlet port 9 of the compressor 1 through the high/low pressure switch valve 2, thereby constituting a heating cycle. According to the present invention, the low pressure coolant gas flow rate regulating valve 10 for controlling the flow rate of the low pressure coolant gas supplied to the inlet port 9 of the compressor 1 is disposed between the compressor 1 and the high/low pressure switch valve 2.

The low pressure coolant gas regulating valve 10 detects the room temperature, coolant temperature or evaporation temperature through a temperature sensor 13 (such as a thermistor), and its opening and closing amount is controlled by the detected signal.

On the other hand, in the example of FIGS. 3A and 3B, the thermistor 6 and the electronic expansion valve 5 of FIGS. 1A and 1B are used in combination, and the capacity of the compressor 1 is controlled by the low pressure coolant gas flow rate regulating valve 10 so that the flow rate of the coolant flowing to a plurality of evaporators (indoor equipment) 4 is controlled collectively. At the same time, the amount of the coolant flowing to the respective evaporators 4 is individually controlled by the electronic expansion valves 5 so that the room temperatures are individually controlled.

As described with reference to FIGS. 1A and 1B, B, the electronic expansion valve 5 is disposed at the first end of the evaporator 4 constituting the heat exchanger 3. Based on the detection of the room temperature made by the thermistor 6, the electronic expansion valve 5 is controlled and the flow rate of a coolant supplied to the evaporator (indoor equipment) 4 is regulated, thereby regulating the room temperature in a cooling and heating cycle.

Figure 4:
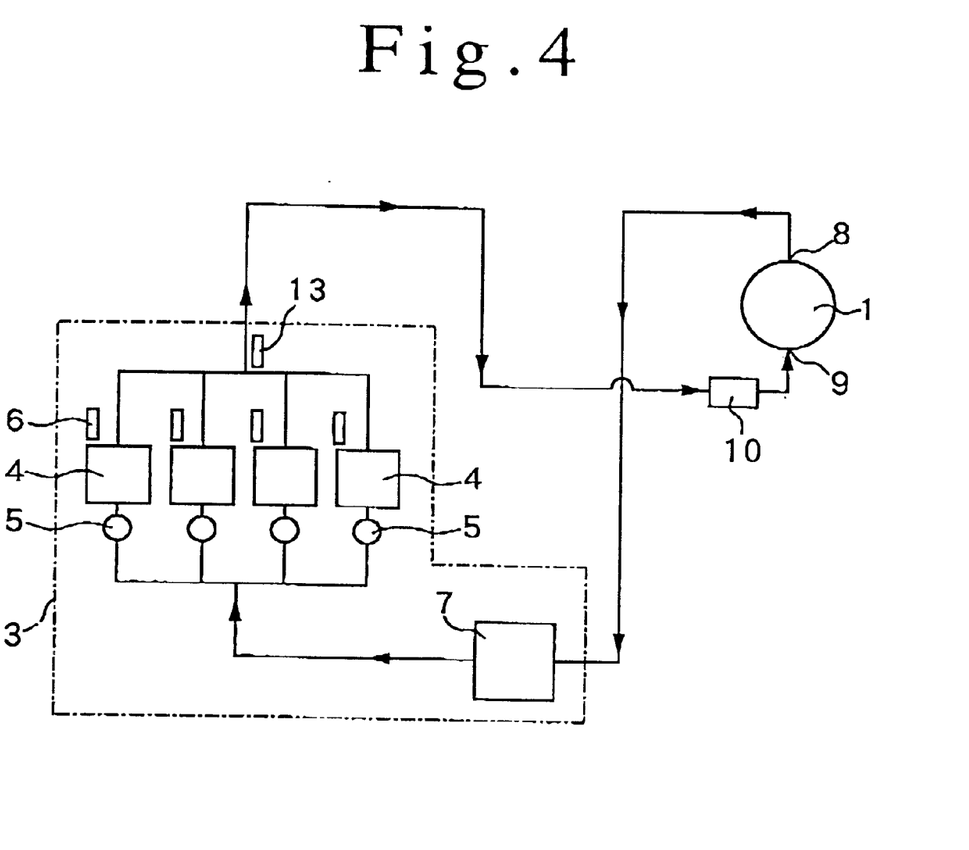
FIG. 4 is a diagram showing a cooling cycle in a refrigerant cycle apparatus according to the present invention.

In the cooling cycle described above, a high pressure coolant gas discharged from an outlet port 8 of a compressor 1 is supplied to the first end of a heat exchanger 3 through a high/low pressure switch valve 2. A low pressure coolant gas expelled from the second end of the heat exchanger 3 is supplied to an inlet port 9 of the compressor 1 through the high/low pressure switch valve 2. A low pressure coolant gas flow rate regulating valve 10 for controlling a flow rate of the low pressure coolant gas supplied to the inlet port 9 of the compressor 1 is disposed between the compressor 1 and the high/low pressure switch valve 2.

More specifically, the heat exchanger 3 is comprised of an evaporator 4 and a condenser 7. The high pressure coolant gas is supplied to one end of the condenser 7 through the high/low pressure switch valve 2, a coolant liquid discharged from the other end of the condenser 7 is supplied to one end of the evaporator 4, and the low pressure coolant gas discharged from the other end of the evaporator 4 is supplied to the inlet port 9 of the compressor 1 through the high/low pressure switch valve 2, thereby constituting a refrigerant cycle.

According to the embodiment of FIG. 4, however, the low pressure coolant gas flow rate regulating valve 10 for controlling the flow rate of the low pressure coolant gas supplied to the inlet port 9 of the compressor 1 is disposed between the inlet port 9 of the compressor 1 and the second end of the heat exchanger 3. Thus, the high/low pressure switch valve 2 is not present in this embodiment. By the flow rate regulation of the low pressure coolant gas supplied to the compressor 1, which regulation is made by the low pressure coolant gas flow rate regulating valve 10, the capacity of the compressor 1 is regulated and the flow rate of the high pressure coolant gas discharged from the compressor 1 and supplied to the condenser 7 is regulated, thereby regulating the temperatures collectively.

Next, a specific example of the construction of a low pressure coolant gas flow rate regulating valve 10 used in the above cooling and heating cycle apparatus and refrigerant cycle apparatus is described.

Figure 5:
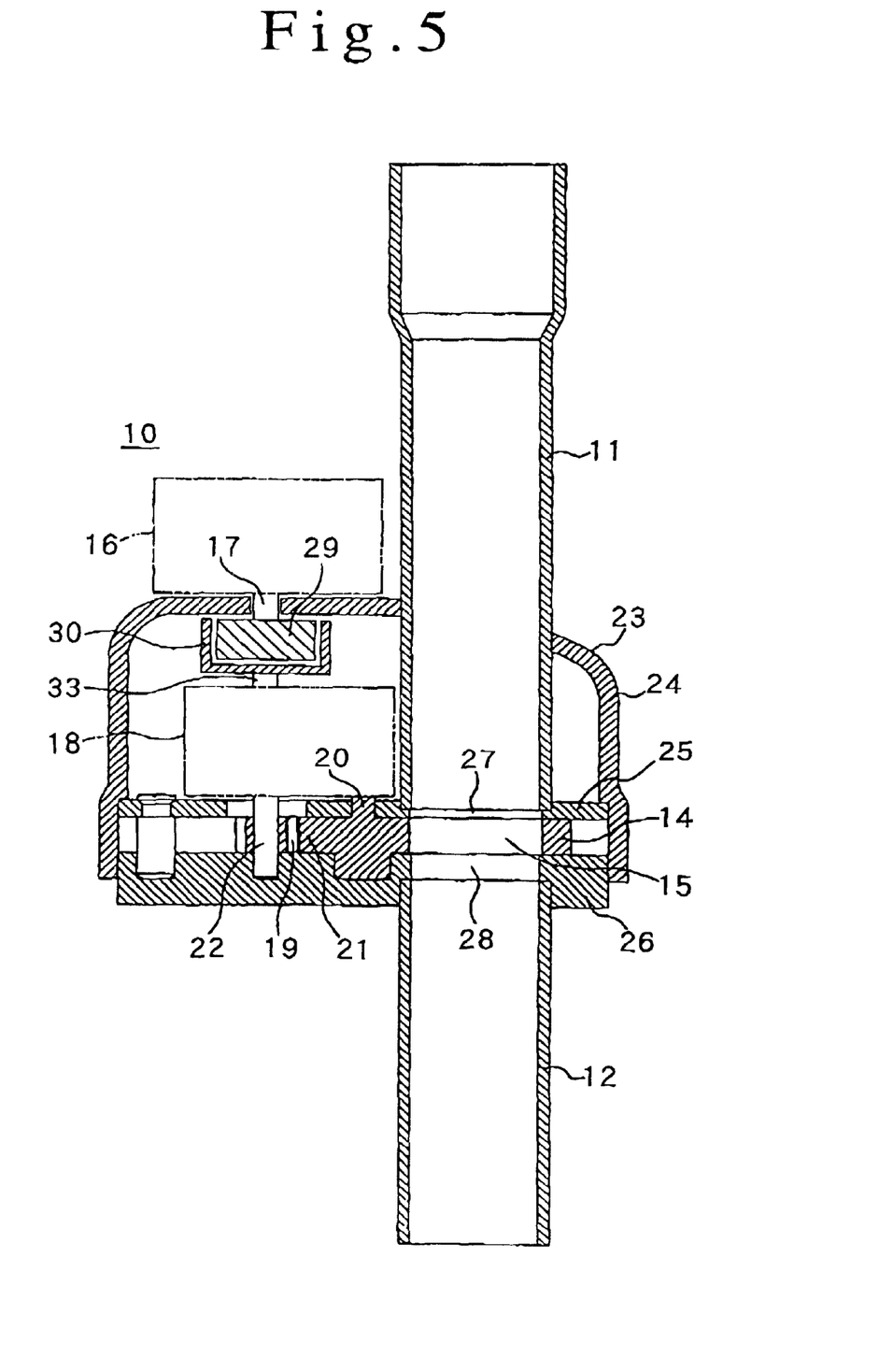
FIG. 5 is a vertical sectional view showing an example of a specific construction of a low pressure coolant gas flow rate regulating valve used in the above-mentioned cooling and heating cycle apparatus and refrigerant cycle apparatus.

The low pressure coolant gas flow rate regulating valve 10 is comprised of a rotatable valve element 14 disposed between the low pressure coolant gas inlet pipe 11 and the low pressure coolant gas outlet pipe 12 for rotation about a fixed fulcrum provided between the low pressure coolant gas inlet pipe 11 and the low pressure coolant gas outlet pipe 12. As a preferred example, the rotatable valve 14 is comprised of a rotatable valve 14, for example, a sector rotatable valve element 14 which exhibits a sector-like configuration and which is sector-rotated at a fixed stroke (fixed sector rotation angle), and the sector rotatable valve element 14 is rotatably supported by an axis 20. The rotatable valve element 14 will be described hereinafter in the form of a sector rotatable valve element 14.

The sector rotatable valve element 14 is provided with a valve hole 15 for passing a low pressure coolant gas discharged from the outlet opening of the low pressure coolant gas inlet pipe 11, and the angle of rotation of the sector rotatable valve element 14 is controlled to regulate a communication area between the low pressure coolant gas passage valve hole 15 and the inlet side opening of the low pressure coolant gas outlet pipe 12, thereby regulating the flow rate of the low pressure coolant gas supplied to the compressor 1.

The sector rotatable valve element 14 is interposed between the outlet opening end face of the low pressure coolant gas inlet pipe 11 and the inlet opening end face of the low pressure coolant gas outlet pipe 12.

As shown in FIG. 5, the sector rotatable valve element 14 uses a motor 16 as a driving source and transmits the rotational driving force of a rotation shaft 17 of the motor 16 to the sector rotatable valve element 14 through a reduction gear mechanism 18, thereby rotating the sector rotatable valve element 14 at a reduced speed.

An output gear 19, which rotates about a shaft 22 of the reduction gear mechanism 18, is engaged with a sector rack 21 disposed at an end portion of the sector rotatable valve element 14 which rotates about the shaft 20, and is controlled by the normal/reverse rotation directions and the normal/reverse rotation amount of the motor 16. Therefore, the normal/reverse rotation directions and the normal/reverse rotation angle of the output gear 19 and the sector rack 21 and thus, the normal/reverse rotation directions and the normal/reverse rotation angle of the sector rotatable valve element 14 are controlled to regulate the communication area between the low pressure coolant gas passage valve element 14 and the inlet side opening of the low pressure coolant gas outlet pipe 12, thereby regulating the flow rate of the low pressure coolant gas supplied to the compressor 1.

Preferably, the sector rotatable valve element 14 is interposed between the outlet opening end face of the low pressure coolant gas inlet pipe 11 and the inlet opening end face of the low pressure coolant gas outlet pipe 12 as previously described.

Specifically, as shown in FIG. 5, the end portion opening face of the low pressure coolant gas inlet pipe 11 and the end portion opening face of the low pressure coolant gas outlet pipe 12 are arranged in such a manner as to be coaxially opposed to each other within a casing 23. On the other hand, the sector rotatable valve element 14 disposed within the casing 23 is interposed between the opening end faces of the two pipes 1 and 12 such that the sector rotatable valve element 14 can rotate in a direction orthogonal to the axis.

For example, a casing body 24 is formed in a cup-like configuration by means of integral press molding or integral synthetic resin molding. Then, a first valve seat 25 and second valve seat 26, which are formed of a plate, are fitted to the opening portion of the cup-like casing body 24 in an airtight manner and in parallel relation. The sector rotatable valve element 14 formed of a plate is interposed between the first valve seat 25 and the second valve seat 26 such that the valve element 14 can sector rotate in parallel relation to the valve seats while slidingly contacting the inner surfaces of the first and second valve seats 25, 26. The sector rotatable valve element 14 is axially supported for sector rotation by at least one of the first valve seat 25 and the second valve seat 26 through the shaft 20.

Likewise, the reduction gear mechanism 18 is disposed within the casing 23, and the output shaft 22 of the reduction gear mechanism 18 is axially supported by the first valve seat 25 or the second valve seat 26. The output gear 19 rotatable about the output shaft 22 is interposed between the first valve seat 25 and the second valve seat 26, and is engaged for motion transmission with the sector rack 21 disposed at an end portion of the sector rotatable valve element 14. Therefore, the sector rotatable valve element 14 can rotate between the first valve seat 25 and the second valve seat 26.

On the other hand, an end portion of the low pressure coolant gas inlet pipe 11 is pierced into a top wall of the casing 23, i.e., a bottom wall of the cup-like casing body 24 so as to project into the casing 23. The end portion of the pipe 11 is supported by the first valve seat 25, and the end portion opening of the pipe 11 coaxially communicates with a valve hole 27 formed in the first valve seat 25. Moreover, an end portion of the low pressure coolant gas outlet pipe 12 is supported by the second valve seat 26, and the end opening portion of the pipe 12 coaxially communicates with a valve hole 28 formed in the second valve seat 26. Thus, the low pressure coolant gas passage valve hole 15 and the valve holes 27, 28 coaxially communicate with each other, and those openings 15, 27, 28 coaxially communicate with the openings of the two pipes 11, 12. The point is that the two pipes 11, 12 coaxially communicate with each other through the sector rotatable valve element 14.

In the present invention, the outlet and inlet for the low pressure coolant gas are coaxially opposed to each other and the rotatable valve element 14 is rotated in a direction orthogonal to the axis between the outlet and the inlet so that the size of the passage allow flow of the low pressure coolant gas is regulated.

The motor 16 is supportingly attached to the top wall of the casing 23 (i.e., outer surface of the bottom wall of the cup-like casing body 24), and the reduction gear mechanism 18 is connected to the rotation shaft 17 parallel to the two pipes 11, 12. A permanent magnet 29 is interposed between the reduction gear mechanism 18 and the rotation shaft 17 of the motor 16 and is disposed within the casing 23. Therefore, the rotational driving force of the motor 16 is transmitted to the reduction gear mechanism 18 through the permanent magnet 29.

Specifically, the permanent magnet 29 is integrally attached to the rotation shaft 17 of the motor 16. On the other hand, a suction plate 30 composed of a magnetic body is disposed on an input shaft 33 of the reduction gear mechanism 18. Rotation of the permanent magnet 29 by the motor 16 causes the suction plate 30 to rotate. The rotation of the suction plate 30 causes the output gear 19 to rotate.

The sector rotatable valve element 14 is controlled in normal/reverse rotation and normal/reverse rotation angle by a detection signal generated by the temperature sensor 13 for detecting the cooling/heating temperature or refrigerant temperature, as represented by a thermistor. The sector rotatable valve element 14 is provided with stoppers 31, 32 adapted to correctly stop the sector rotatable valve element 14 in this normal/reverse rotation position.

The stoppers 31, 32 are formed by pins erected in a space between the first valve seat 25 and the second valve seat 26. The maximum rotation angle of the sector rotatable valve element 14 is limited to an area between the pair of pins serving as the stoppers 31, 32.

Figure 6:
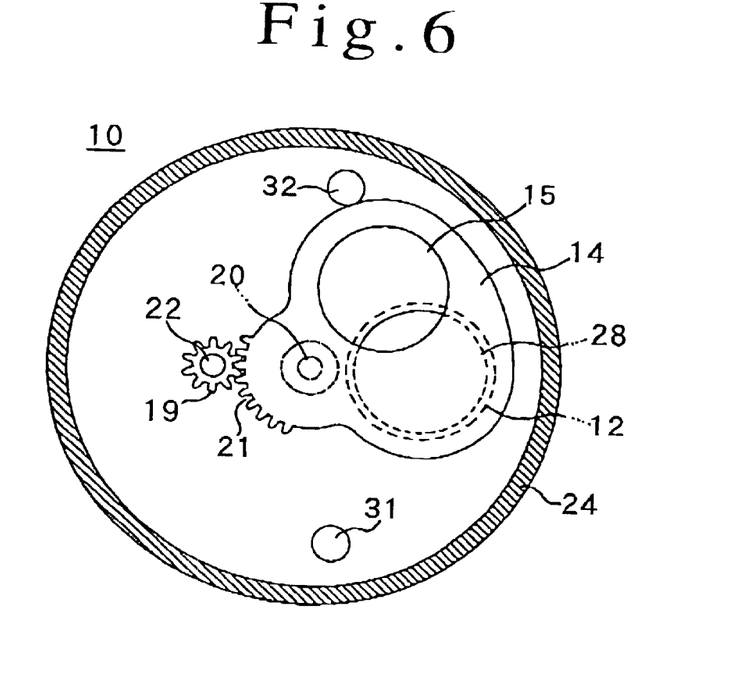
FIG. 6 is a cross sectional view showing a partly open state of the regulating valve.

As shown in FIG. 6, when the sector rotatable valve element 14 is in abutment with one of the two stoppers 32, the valve hole 15 partly communicates with the valve holes 27, 28. That is to say, they communicate with each other through the minimum communication opening area and are held standby.

Figure 7:
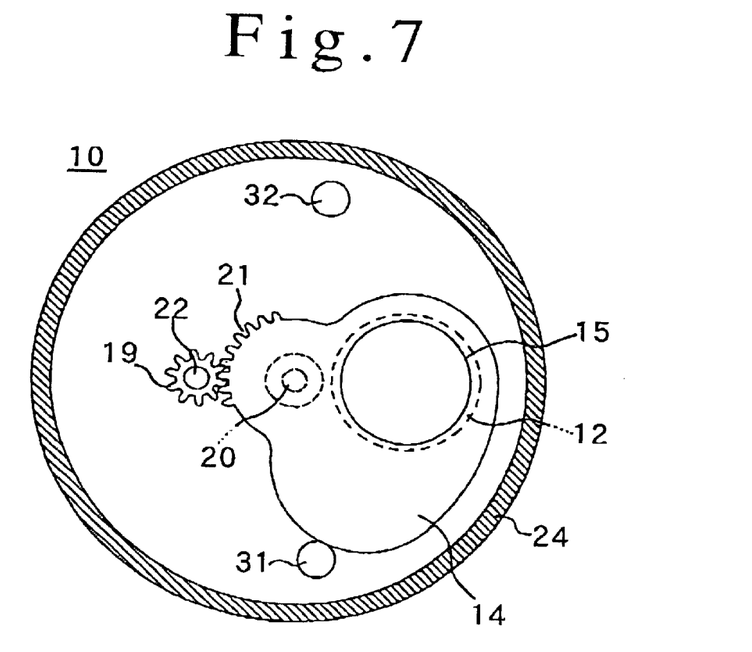
FIG. 7 is a cross sectional view showing a completely open state of the regulating valve.

In such a standby state, when the sector rotatable valve element 14 is rotated a predetermined amount towards the stopper 31, the communication area between the valve hole 15 and the valve holes 27, 28 is enlarged. As shown in FIG. 7, when the valve element 14 is abutted with the stopper 31, the valve hole 15 fully communicates with the valve holes 27, 28. In other words, their communication area becomes maximum.

Through the control of the communication area, the amount of the low pressure coolant gas supplied to the compressor 1 is controlled. For example, the rotating time of the motor 16 is detected or the number of rotations of the motor 16 is detected by a sensor such as a Hole-effect device, and the rotation angle of the rotatable valve element 14 is controlled and set based on the detected signals.

As previously mentioned, conventionally, the amount of rotation of the motor is controlled by an inverter, thereby controlling the high pressure output of the compressor. In contrast, according to the present invention, by using the low pressure coolant flow rate regulating valve instead of the inverter, the output of the compressor, i.e., the low pressure coolant gas can be controlled stably and properly and the cost of the compressor can be reduced.

While the invention has been described in the form of one preferred embodiment, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the present invention as set forth in the appended claims.

What is claimed is:

1. A cooling and heating cycle apparatus comprising:
   a compressor having an inlet port and an outlet port;
   a heat exchanger having a first end and a second end;
   a pressure switch valve located between said compressor and said heat e changer and adapted to receive and selectively supply high pressure coolant gas discharged from said outlet port of said compressor to one of said first end and said second end of said heat exchanger, and adapted to receive low pressure coolant gas from the other of said first end and said second end of said heat exchanger and to supply the low pressure coolant gas to said inlet port of said compressor; and
   a coolant gas flow rate regulating valve between said pressure switch valve and said compressor for regulating a flow rate of the low pressure coolant gas to said inlet port of said compressor, said coolant gas flow rate regulating valve including:
      a motor;
      a permanent magnet;
      a suction plate;
      a reduction gear mechanism having an output gear, where in said motor, said permanent magnet, said suction plate, and said reduction gear mechanism are arranged such that a rotational driving force of said motor is transmitted to said reduction gear mechanism via said permanent magnet and said suction plate so as to rotate said reduction gear mechanism; and
      a rotatable valve element having a rack for engaging said output gear of said reduction gear mechanism such that said reduction gear mechanism is operable to rotate said valve element in a forward and a reverse direction variable amounts so as to regulate a flow rare of the low pressure coolant gas to said compressor.

2. The cooling and heating cycle apparatus of claim 1, wherein said flow rate regulating valve further includes a pair of stop pins for limiting a rotation of said valve element.

3. A cooling and heating cycle apparatus comprising:
   a compressor having an inlet port and an outlet port;
   a heat exchanger having a first end and a second end;
   a pressure switch valve located between said compressor and said heat exchanger and adapted to receive and selectively supply high pressure coolant gas discharged from said outlet port of said compressor to one of said first end and said second end of said heat exchanger, and adapted to receive low pressure coolant gas from the other of said first end and said second end of said heat exchanger and to supply the low pressure coolant gas to said inlet port of said compressor; and a coolant gas flow rate regulating valve between said pressure switch valve and said compressor for regulating a flow rate of the low pressure coolant gas to said inlet port of said compressor, said coolant gas flow rate regulating valve including:
- a coolant gas inlet pipe having an outlet end opening face;
- a coolant gas outlet pipe having an inlet end opening face opposing said outlet end opening face of said inlet pipe;
- a first valve seat supporting an outlet end of said inlet pipe;
- a second valve seat supporting an inlet end of said outlet pipe, said first valve seat and said second valve seat being arranged in a parallel relation; and
- a rotatable valve element between said outlet end opening face of said inlet pipe and said inlet end opening face of said outlet pipe and arranged so as to be rotatable parallel to and between said first valve seat and said second valve seat about an axis of rotation, said valve element being supported at said axis of rotation by at least one of said first valve seat and said second valve seat, said valve element including a valve hole for forming a communication area between said outlet end opening face of said inlet pipe and said inlet end opening face of said outlet pipe, wherein a size of said communication area is regulated by controlling a rotation of said valve element so as to regulate a flow rate of low pressure coolant gas to said compressor.

4. The cooling and heating cycle apparatus of claim 3, wherein said outlet end opening face of said inlet pipe, said inlet end opening face of said outlet pipe, said first valve seat, and said second valve seat share a central axis, and wherein said axis of rotation of said valve element is nonconcentric with said central axis.

5. The cooling and heating cycle apparatus of claim 3, wherein said coolant gas flow rate regulating valve further includes:
- a motor;
- a permanent magnet;
- a suction plate;
- a reduction gear mechanism having an output gear, wherein said motor, said permanent magnet, said suction plate, and said reduction gear mechanism are arranged such that a rotational driving force of said motor is transmitted to said reduction mechanism via said permanent magnet and said suction plate so as to rotate said reduction gear mechanism; and
- wherein said rotatable valve element has a rack for engaging said output gear of said reduction gear mechanism such that said reduction gear mechanism is operable to rotate said valve element in a forward and a reverse direction variable amounts so as to regulate the flow rate of the low pressure coolant gas to said compressor.

6. A refrigerant cycle apparatus comprising:
a compressor having an inlet port and an outlet port;
a heat exchanger having a first end and a second end, said compressor and said heat exchanger being arranged such that a high pressure coolant gas discharged from said outlet port of said compressor is supplied to said first end of said heat exchanger, and such that a low pressure coolant gas from said second end of said heat exchanger is supplied to said inlet port of said compressor; and a coolant gas flow rate regulating valve between said second end of said heat exchanger and said inlet port of said compressor for regulating a flow rate of the low pressure coolant gas to said inlet port of said compressor, said coolant gas flow rate regulating valve including:
- a motor;
- a permanent magnet;
- a suction plate;
- a reduction gear mechanism having an output gear, wherein said motor, said permanent magnet, said suction plate, and said reduction gear mechanism are arranged such that a rotational driving force of said motor is transmitted to said reduction gear mechanism via said permanent magnet and said suction plate so as to rotate said reduction gear mechanism; and
- a rotatable valve element having a rack for engaging said output gear of said reduction gear mechanism such that said reduction gear mechanism is operable to rotate said valve element in a forward and a reverse direction variable amounts so as to regulate a flow rate of the low pressure coolant gas to said compressor.

7. The cooling and heating cycle apparatus of claim 6, wherein said flow rate regulating valve further includes a pair of stop pins for limiting a rotation of said valve element.

8. A refrigerant cycle apparatus comprising:
a compressor having an inlet port and an outlet port;
a heat exchanger having a first end and a second end, said compressor and said heat exchanger being arranged such that a high pressure coolant gas discharged from said outlet port of said compressor is supplied to said first end of said heat exchanger, and such that a low pressure coolant gas from said second end of said heat exchanger is supplied to said inlet port of said compressor; and
a coolant gas flow rate regulating valve between said second end of said heat exchanger and said inlet port of said compressor for regulating a flow rate of the low pressure coolant gas to said inlet port of said compressor, said coolant gas flow rate regulating valve including:
- a coolant gas inlet pipe having an outlet end opening face;
- a coolant gas outlet pipe having an inlet end opening face opposing said outlet end opening face of said inlet pipe;
- a first valve seat supporting an outlet end of said inlet pipe;
- a second valve seat supporting an inlet end of said outlet pipe, said first valve seat and said second valve seat being arranged in a parallel relation; and
- a rotatable valve element between said outlet end opening face of said inlet pipe and said inlet end opening face of said outlet pipe and arranged so as to be rotatable parallel to and between said first valve seat and said second valve seat about an axis of rotation, said valve element being supported at said axis of rotation by at least one of said first valve seat and said second valve seat, said valve element including a valve hole for forming a communication area between said outlet end opening face of said inlet pipe and said inlet end opening face of said outlet pipe, wherein a size of said communication area is regulated by controlling a rotation of said valve element so as to regulate a flow rate of low pressure coolant gas to said compressor.

9. The cooling and heating cycle apparatus of claim 8, wherein said outlet end opening face of said inlet pipe, said inlet end opening face of said outlet pipe, said first valve seat, and said second valve seat share a central axis, and wherein said axis of rotation of said valve element is non-concentric with said central axis.

10. The cooling and heating cycle apparatus of claim 8, wherein said coolant gas flow rate regulating valve further includes:
- a motor;
- a permanent magnet;
- a suction plate;
- a reduction gear mechanism having an output gear, wherein said motor, said permanent magnet, said suction plate, and said reduction gear mechanism are arranged such that a rotational driving force of said motor is transmitted to said reduction gear mechanism via said permanent magnet and said suction plate so as to rotate said reduction gear mechanism; and wherein said rotatable valve element has a rack for engaging said output gear of said reduction gear mechanism such that said reduction gear mechanism is operable to rotate said valve element in a forward and a reverse direction variable amounts so as to regulate the flow rate of the low pressure coolant gas to said compressor.

* * * * *